US007573456B2

(12) United States Patent
Nohtomi

(10) Patent No.: US 7,573,456 B2
(45) Date of Patent: Aug. 11, 2009

(54) SEMICONDUCTOR INTEGRATED CIRCUIT DEVICE AND LIQUID CRYSTAL DISPLAY DRIVING SEMICONDUCTOR INTEGRATED CIRCUIT DEVICE

(75) Inventor: Shinobu Nohtomi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 630 days.

(21) Appl. No.: 11/434,846

(22) Filed: May 17, 2006

(65) Prior Publication Data

US 2006/0262068 A1 Nov. 23, 2006

(30) Foreign Application Priority Data

May 18, 2005 (JP) ............................ 2005-145036

(51) Int. Cl.
*G09G 3/36* (2006.01)
*G06F 3/038* (2006.01)

(52) U.S. Cl. ......................... 345/100; 345/87; 345/211; 315/160

(58) Field of Classification Search ................... 345/87, 345/98–100, 204, 211, 205–206
See application file for complete search history.

(56) References Cited

U.S. PATENT DOCUMENTS 5,457,420 A * 10/1995 Asada ........................ 327/437
6,081,131 A * 6/2000 Ishii ............................ 326/68
6,919,873 B2 * 7/2005 Sato et al. ..................... 345/98
6,970,162 B2 * 11/2005 Murayama et al. .......... 345/211
2004/0105140 A1 6/2004 Fujita

FOREIGN PATENT DOCUMENTS

JP 2004-163600 6/2004

* cited by examiner

*Primary Examiner*—Duc Q Dinh
(74) *Attorney, Agent, or Firm*—Miles & Stockbridge P.C.

(57) ABSTRACT

A voltage impressed across the drain and source is reduced by further connecting in series one or two or more transistors between a couple of transistors in an output circuit including an output stage formed by connecting in series a couple of output transistors between a couple of power source voltage terminals and outputting the signal supplied to a gate signal generating circuit of a liquid crystal panel. Simultaneously, potential setting switch elements are also provided to prepare an intermediate potential of a couple of power source voltages and impress the intermediate potential to a base material of output transistors of the OFF state while the output transistors are turned OFF. Thereby, a liquid crystal display driving semiconductor integrated circuit may be realized. Accordingly, low manufacturing cost can also be realized without use of the high voltage resistance process by constituting a circuit for outputting the signal supplied to a gate signal generating circuit of a liquid crystal panel with an element having low resistance voltage. Moreover, operation rate of the output circuit can be improved and power consumption thereof can also be reduced.

10 Claims, 5 Drawing Sheets

SEMICONDUCTOR INTEGRATED CIRCUIT DEVICE AND LIQUID CRYSTAL DISPLAY DRIVING SEMICONDUCTOR INTEGRATED CIRCUIT DEVICE

CROSS-REFERENCE TO RELATED APPLICATION

The present application claims priority from Japanese patent application No. 2005-145036 filed on May 18, 2005, the content of which is hereby incorporated by reference into this application.

BACKGROUND OF THE INVENTION

The present invention relates to the technology which can be applied effectively to a semiconductor integrated circuit (IC) including an output circuit for outputting high potential difference signals and more specifically to the technology which can be applied effectively to a liquid crystal display driving IC (liquid crystal control driver) comprising a circuit for outputting the signal supplied, for example, to a liquid crystal panel.

In recent years, as a display unit of a portable electronic apparatus such as a mobile phone and a PDA (Personal Digital Assistants), a dot matrix type liquid crystal panel, wherein a plurality of display pixels are generally arranged in two dimensions, for example, in a matrix shape, is utilized and this apparatus comprises therein a liquid crystal display controller (liquid crystal control driver IC) constituted as a semiconductor integrated circuit for controlling and driving display to this liquid crystal panel.

An internal logic circuit or the like within this liquid crystal control driver IC is usually capable of operating with a voltage as low as 5V or less, while display drive of the liquid crystal panel requires a voltage as high as 20 to 40V. Therefore, the liquid crystal control driver IC is provided with a drive circuit and an output circuit being operated with voltages boosted up from the power supply voltage, in addition to internal logic circuits being operated with voltages of 5V or less.

As is well known, a dot matrix type liquid crystal panel is provided, in addition to the signal lines to which the image signal is impressed, with scanning lines allocated in the direction crossing the signal line and sequentially driven to the selection level and provided with pixels at the intersecting points of the signal lines and scanning lines. Therefore, the liquid crystal display driving IC of the related art for driving the liquid crystal panel has been generally provided with a driving circuit (source driver) for outputting voltage applied to the signal lines (data lines) and a driving circuit (common driver) for outputting voltage applied to the scanning lines.

However, in recent years, as a TFT liquid crystal panel, those mounting a scanning line driving circuit and a data line driving circuit constituted by TFT have been provided. The liquid crystal panel of the structure explained above is disclosed, for example, in the patent document 1. The liquid crystal display driving IC for driving display of the liquid crystal panel provided with the scanning line driving circuit has the advantages that the scanning line driving circuit is no longer required and chip size can be reduced.

[Patent Document 1]

Japanese Unexamined Patent Publication No. 2004-163600

SUMMARY OF THE INVENTION

In recent years, several hundreds of scanning lines are provided with improvement in display size and display precision. By the way, a scanning line driving circuit may be constituted by a comparatively simple circuit such as a shift register because it is the circuit for sequentially selecting and driving the scanning lines.

When such scanning line driving circuit is provided in a liquid crystal display driving IC, the liquid crystal display driving IC is required to provide a circuit for outputting several hundreds of drive signals corresponding to the number of scanning lines. Meanwhile, when the scanning line driving circuit is provided in the liquid crystal panel, it is enough to provide a circuit for outputting several (generally, three to six) timing signals and clock signals for the operations of the scanning line driving circuit synchronized with the horizontal synchronization signal and frame synchronization signal.

Moreover, in any case, the signal supplied to the liquid crystal panel from the liquid crystal display driving IC is the signal in the amplitude larger than that of the ordinary IC, for example, of 20V to −10V and the circuit for outputting such signal is constituted by an element having higher voltage resistance. However, the element having higher voltage resistance has a demerit that the operating rate is slower than that of the element having lower voltage resistance. Therefore, an internal circuit is comprised of an element having lower voltage resistance to realize low power consumption and high operation rate, and the circuit is designed to operate with a lower operating power source voltage. However, the semiconductor integrated circuit using simultaneously the element having higher voltage resistance and the element having lower voltage resistance is complicated in manufacturing processes, resulting in rise of cost.

When the scanning line driving circuit is provided in the liquid crystal display driving IC as explained above, it is required to provide a circuit for outputting several hundreds of driving signals. However, when the scanning line driving circuit is provided in the liquid crystal panel, it is enough when a circuit is provided in the liquid crystal display driving IC for outputting several signals. However, cost performance is remarkably deteriorated if high voltage resistance process is employed by using an element having higher voltage resistance for the small number of elements to constitute the circuit for outputting such several signals.

An object of the present invention is to constitute an output circuit with an element having low voltage resistance and to realize low manufacturing cost without use of the process having high voltage resistance, in the semiconductor integrated circuit comprising an output circuit for outputting signals having high potential difference such as the liquid crystal display driving semiconductor integrated circuit for driving a liquid crystal panel on which a scanning line driving circuit is mounted for example.

Another object of the present invention is to improve operation rate of an output circuit and reducing power consumption by constituting the output circuit with an element having low voltage resistance in the semiconductor integrated circuit including the output circuit for outputting high voltage difference signals such as the liquid crystal display driving semiconductor integrated circuit for driving the liquid crystal panel on which a scanning line driving circuit is mounted for example.

The aforementioned objects, the other objects and the novel features of the present invention will become apparent from the description of the specification of the present invention and the accompanying drawings thereof.

The typical inventions disclosed in the present application will be summarized as follows.

Namely, in an output circuit including an output stage formed with a couple of output transistors connected in series between a couple of power supply voltage terminals, one or two or more transistors are additionally connected in series between a couple of output transistors in order to reduce a voltage applied between the drain and source of the output transistor. Moreover, a switch element for setting a potential is also provided such that an intermediate potential of the two power source voltages is prepared to applying the intermediate potential to a base material of the output transistor in turn-OFF state while the output transistor is turned OFF.

According to the means explained above, since it is possible to disable application of a higher voltage to the output transistor in the output circuit for outputting the signal of higher voltage difference using the power source voltage higher than the power source voltage in an internal circuit, the output circuit can be constituted by an element having a comparatively lower voltage resistance. Therefore, a transistor for constituting the output circuit without use of high voltage resistance process may be formed and thereby low manufacturing cost can be realized.

Moreover, a transistor of low voltage resistance has an ON resistance smaller than that of the transistor of high voltage resistance and also has a lower threshold voltage. Therefore, the output impedance characteristic can be improved by constituting an output stage with the transistor of lower voltage resistance. As a result, operation rate of the output circuit can be improved and power consumption can also be reduced.

In addition, in the liquid crystal display driving semiconductor integrated circuit comprising a signal line driving circuit to drive an internal logic circuit and signal line (source line) in order to drive a liquid crystal panel mounting a scanning line driving circuit, the signal line driving circuit is constituted by an element having the voltage resistance (for example, 20V) higher than that of the element forming the internal logic circuit. Accordingly, when it is possible to constitute the scanning line driving circuit with the element having the voltage resistance (20V) lower than that of the element having the voltage resistance (for example, 40V) constituting the on-chip scanning line driving circuit of the related art, the scanning line driving circuit can be constituted by the element having the voltage resistance equal to that of the element constituting the signal line driving circuit.

Accordingly, even when the voltage (20V) higher than that applied to the element constituting the internal logic circuit is impressed to the element constituting the scanning line driving circuit, breakdown of the element can be prevented and thereby it is no longer required to use the high voltage resistance process (20V voltage resistance process) only for the element constituting the scanning line driving circuit. That is, the process can be more simplified than that used to form both the elements of 20V and 40V voltage resistances.

The exemplary advantages of the typical inventions among those disclosed in the present application will be explained as follows.

Namely, the present invention can provide the advantages that low manufacturing cost can be achieved, operation rate of the output circuit can be improved, and power consumption can also be reduced by constituting the output circuit with the element having low voltage resistance and realizing manufacture without use of the process of high voltage resistance, in the semiconductor integrated circuit including the output circuit for outputting the signals of high voltage differences.

BRIEF DESCRIPTION OF THE DRAWINGS

FIGS. 5A and 5B are cross-sectional views showing the structures of elements (MOSFET) used in the liquid crystal control driver IC of the preferred embodiment, in which FIG. 5A shows a structure of an element having high voltage resistance and FIG. 5B shows a structure of an element having low voltage resistance;

DESCRIPTION OF THE PREFERRED EMBODIMENT

The preferred embodiment of the present invention will be explained below with reference to the accompanying drawings.

Figure 1:
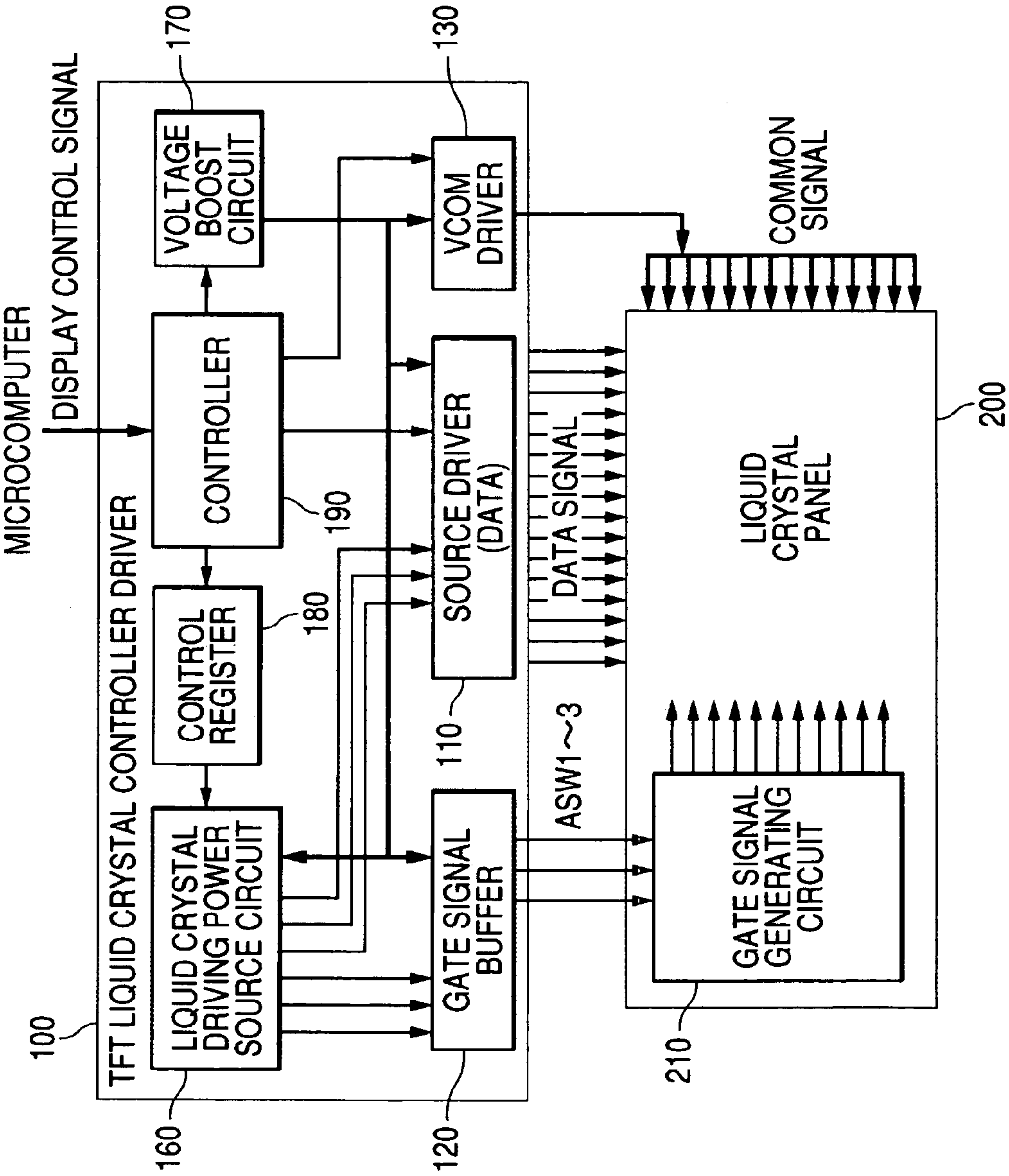
FIG. 1 is a block diagram showing a schematic structure of a liquid crystal display system comprising a liquid crystal display driving semiconductor integrated circuit (liquid crystal control driver IC) to which the present invention can be applied effectively and a liquid crystal panel driven with the same driver IC.

FIG. 1 shows a schematic structure of a liquid crystal display system comprising a liquid crystal display driving semiconductor integrated circuit (liquid crystal control driver IC) 100 to which the present invention is applied and a liquid crystal panel 200 driven with this driver IC. As shown in FIG. 1, the liquid crystal panel 200 driven with the liquid crystal control driver IC 100 of this embodiment is provided with a gate signal generating circuit (scanning line driving circuit) 210 formed of a shift register or the like for sequentially driving the scanning lines on the panel.

The liquid crystal control driver IC 100 comprises a source driver circuit 110 for generating and outputting the data signal to be applied to the source lines, a gate signal buffer 120 for outputting the signal supplied to the gate signal generating circuit 210, and a common driver circuit 130 for generating and outputting the signal applied to a common electrode of the liquid crystal panel. The gate signal buffer 120 generates and outputs signals ASW1 to 3 such as the timing signal and clock signal for controlling the gate signal generating circuit 210 to generate the gate signal with operations synchronized with the horizontal synchronizing signal and the frame synchronizing signal. Although not particularly restricted, the signals ASW1 to 3 are defined as the signal changing in the amplitude of +20V to −10V in this embodiment. One of the signals ASW1 to 3 is the timing signal for starting the shift operation of the shift register and giving the data "1" which is sequentially transferred and the remaining two signals are shift clocks including a phase difference of 180°.

Moreover, the liquid crystal control driver IC 100 of this embodiment is also provided with a liquid crystal driving power source circuit 160 for generating a liquid crystal gradation voltage used in the source driver circuit 110 and gate signal buffer 120 and a constant voltage as the reference voltage of the gradation voltage, and a voltage boost circuit 170 for generating a boosted voltage used in the power source circuit 160, driver circuits 110, 130, and output buffer 120.

In addition, the driver IC 100 is also provided with a control register 180 for designating amplitude and characteristic of the gradation voltage generated with the liquid crystal driving power source circuit 160 and a controller 190 for generating the control signal of the internal circuit and processing the display data by receiving commands and display data from a microcomputer in the outside of a chip. Although not shown in FIG. 1, a RAM (Random Access Memory) is also provided as required for storing the display data supplied from the microcomputer in the external side.

Next, a structure of a TFT liquid crystal panel 200 driven with the liquid crystal control driver IC to which the present invention is applied will be explained with reference to FIG. 2.

Figure 2:
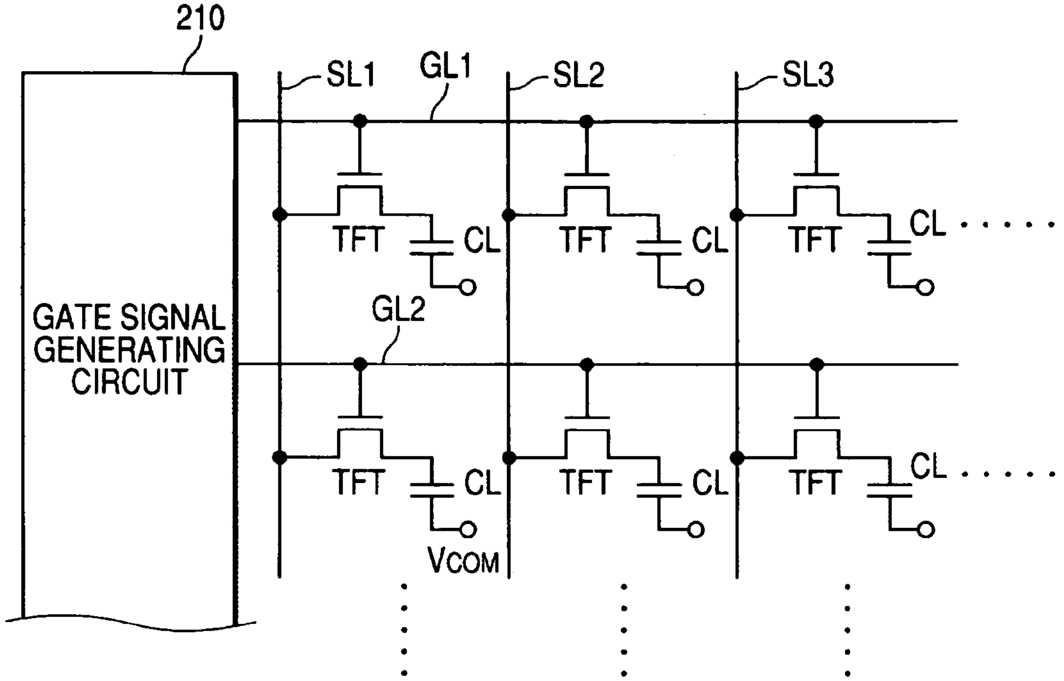
FIG. 2 is a block diagram showing a structure of a TFT liquid crystal panel driven with the liquid crystal control driver to which the present invention is applied effectively.

The liquid crystal panel 200 of FIG. 2 is formed by allocating, on a transparent substrate like a glass substrate, the source lines (source electrodes) SL1, SL2, SL3, . . . as a plurality of signal lines to which the image signal is applied and the gate lines (gate electrodes) GL1, GL2, . . . as a plurality of scanning lines which are sequentially selected and driven at a predetermined period, in an orthogonal direction to each other. The gate lines (gate electrodes) GL1, GL2, . . . are connected with the gate signal generating circuit 210 and the drive voltage of the selection level is sequentially applied to any one of the gate lines. Moreover, pixels are allocated at each intersecting point between the source lines SL1, SL2, SL3, . . . and the gate lines GL1, GL2, . . . .

Each pixel is formed of a TFT (thins film transistor) as a selection element connected at a gate terminal with any of the gate lines and also connected at a source terminal with any of the source lines and of a pixel capacitance connected between a drain terminal of the TFT and an opposing electrode in common to each pixel for giving the liquid crystal center potential (COM potential) VCOM. These pixels are respectively provided at each intersecting point of the source lines and gate lines to form an active matrix type panel.

Gradation display is performed by applying a voltage to the liquid crystal held between one electrode (pixel electrode) and the opposing electrode of the pixel capacitance connected to the drain terminal of the TFT for selection to change luminance of pixels through change in polarization coefficient of the liquid crystal in accordance with a potential difference between the potential of pixel electrodes and COM potential. Moreover, since the liquid crystal is deteriorated when a DC voltage is applied continuously, an alternate drive is performed by alternately selecting the positive and negative potentials around the liquid crystal center potential VCOM as the voltage applied to the source lines and gate lines.

Figure 3:
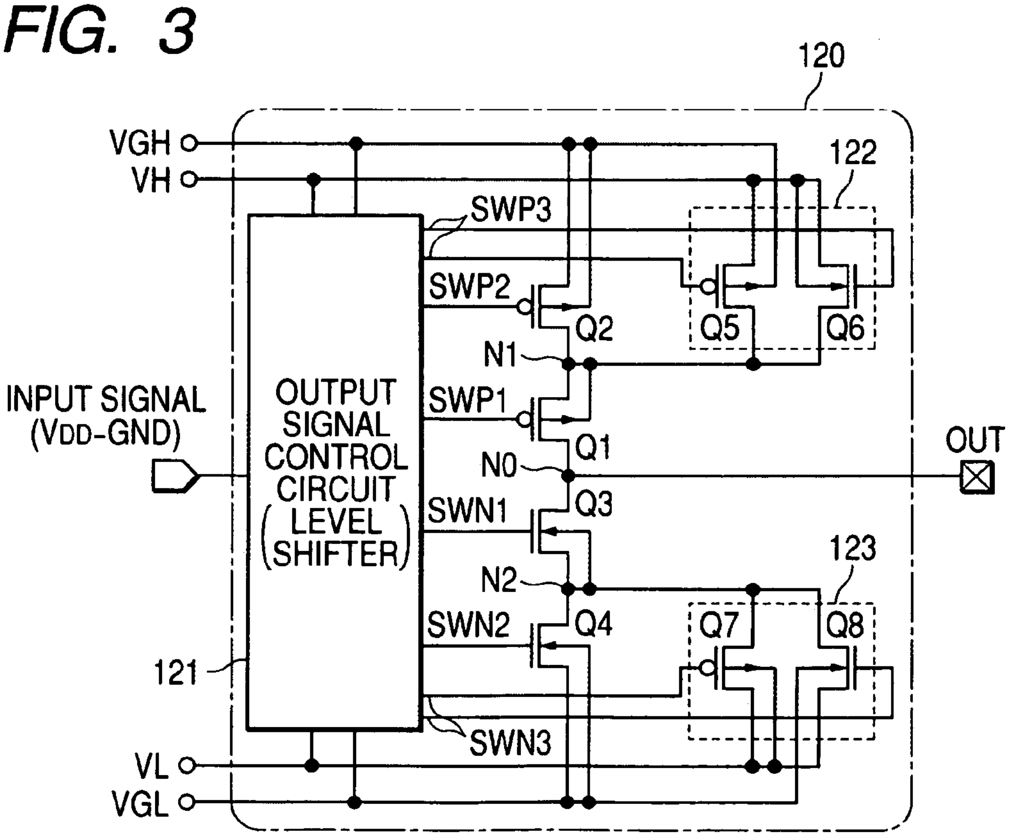
FIG. 3 is a circuit structure diagram showing an embodiment of a gate signal buffer in the liquid crystal control driver IC to which the present invention is applied effectively.

FIG. 3 shows an embodiment of the gate signal buffer 120 in the liquid crystal control driver IC to which the present invention is applied. In FIG. 3, the MOSFET (insulated gate type field effect transistor) given the mark ◘ at the gate thereof indicates the P-channel type MOSFET, while the MOSFET not given the mark ◘ at the gate thereof indicates the N-channel type MOSFET.

The gate signal buffer 120 of this embodiment is comprised of a push-pull type output stage formed of MOSFET Q1 to Q4 and an output control logic circuit 121 for generating the signals SWP2, SWP1, SWN1, and SWN2 impressed to the gate terminals of the MOSFET Q1 to Q4. The MOSFET Q1 to Q4 in the output stage is connected in series between a power source terminal to which a high power source voltage VGH as high as, for example, 20V is applied and a power source terminal to which a low power source voltage VGL as low as −10V is applied. The output control logic circuit 121 has the function as a level shifter for receiving the signal IN of the amplitude such as logic voltage VDD—ground potential GND (for example, 5V-0V) supplied from an internal logic and converting the received signal to the signal of the amplitude suitable for respective MOSFETs.

Connections are made so that to a base material (substrate or well region) of the MOSFET Q2 among those Q1 to Q4 of the output stage, a high power source voltage VGH is impressed and to a base material of Q5, a low power source voltage VGL is impressed. Meanwhile, to a base material of the MOSFET Q1, a potential at the connecting node N1 of the Q1 and Q2 is impressed, and to a base material of the MOSFET Q3, a potential of the connecting node N2 of the Q3 and Q4 is impressed.

Moreover, the gate signal buffer 120 in this embodiment is provided with a potential setting means 122 formed of the MOSFETs Q5 and Q6 for setting a potential of the connecting node N1 of the MOSFET Q1 and Q2 and a potential setting means 123 formed of the MOSFETs Q7 and Q8 for setting a potential of the connecting node N2 of the MOSFETs Q3 and Q4. The MOSFETs Q5 and Q6 are transmission gates formed of P-channel MOSFET and N-channel MOSFET connected in parallel to result in less amount of potential drop and these are connected in parallel between a high power source voltage VH and the connecting node N1. Moreover, the MOSFETs Q7 and Q8 also form the transmission gates and are connected in parallel between the connecting node N2 of Q3 and Q4 and a power source voltage VL. The high power source voltage VH is set, for example, to a potential such as 10V, while the low power source voltage VL is set, for example, to a potential such as 0V.

In addition, a power source voltage VGH is impressed to the base materials (well regions) of Q1 and Q5 and a power source voltage VGL to the base materials of Q4 and Q8. Accordingly, the PN junction between the base materials and drain region is forward biased to prevent flow of a leak current.

Figures 4A, 4B, 4C, 4D:
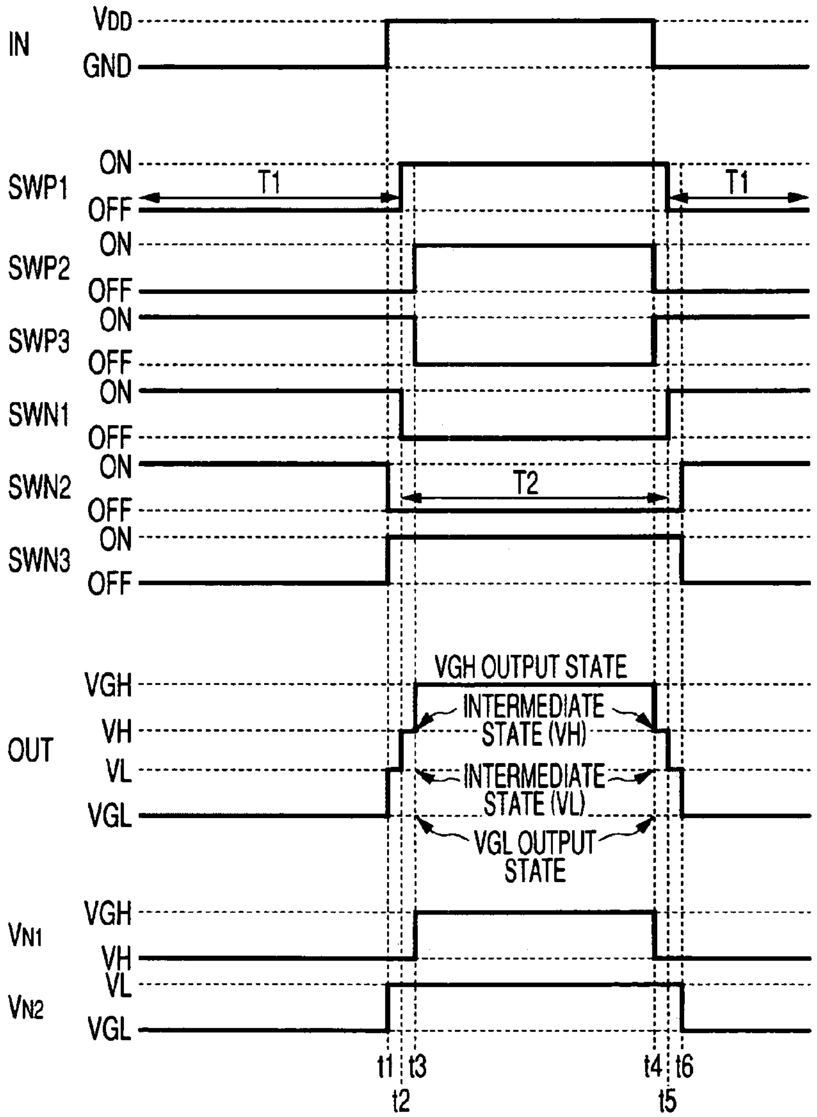
FIGS. 4A to 4D are timing charts showing potential changes of the signals and the nodes in the gate signal buffer of FIG. 3.

FIGS. 4A to 4B show operation timings of the gate signal buffer of FIG. 3. When the signal IN in the amplitude of VDD to 0V of FIG. 4A is inputted to the output control logic circuit 121, the gate control signals SWP1 to SWN3 changing as shown in FIG. 4B are generated in accordance with rise and fall of the signal IN. The signal SWP1 among the SWP1 to SWN3 is impressed to the gate terminal of the MOSFET Q1, while the signal SWP2, to the gate terminal of the MOSFET Q2. Moreover, the SWN1 is impressed to the gate terminal of the MOSFET Q3 and the SWN2 to the gate terminal of the MOSFET Q4. In addition, the SWP1 is impressed to the gate terminals of the MOSFETs Q5, Q6 for setting a high level side potential and the SWN3 to the gate terminals of the MOSFETs Q7, Q8 for setting a low level side potential.

The gate control signals SWP1 to SWN3 of FIG. 4B show the ON state or OFF state of the corresponding MOSFET and do not show potentials. Namely, when the corresponding MOSFET is P-channel type, the low level of the gate control signal corresponds to the ON state, while the high level of the gate control signal to the OFF state. In addition, when the corresponding MOSFET is N-channel type, the high level of the gate control signal corresponds to the ON state, while the low level of the gate control signal to the OFF state. Moreover, even when the transistors are of the same conductivity type like the Q1 and Q2, since the voltages impressed to the source and drain are different, a level of the gate control signal also changes in accordance with such voltages.

When the input signal IN changes to high level from low level, the MOSFET Q4, which is far from the output node N0, among Q1 to Q4 is first turned OFF by the gate control signals SWP1, SWP2, SWN1, SWN2 changing as shown in FIG. 4B. Subsequently, the MOSFET Q3, which is nearer to the output node N0, is turned OFF and then Q1 is turned ON. Finally, Q2, which is further from the output node N0, is turned ON. Accordingly, it can be prevented that Q1 to Q4 are simultaneously turned ON to prevent the through-current to flow.

Moreover, the liquid crystal control driver IC is provided with a voltage boost circuit 170 for generating the boosted voltage used in the driver circuit 110 and gate signal buffer 120. The power source voltages VGH (20V) and VH (10V) which are higher than the internal power source voltage VDD (5V) are generated with the voltage boost circuit 170. When attention is paid to the potential VN1 of the node N1, the voltage VGH changes to VH in the timing t4 as shown in FIG. 4D. In this timing, charges of the node N1 are absorbed with the voltage boost circuit (charge pump) for generating the voltage VH. In the circuit of the related art where the output stage is formed of a couple of MOSFETs (Q1 and Q4 or Q2 and Q3) connected in series, potential change at the output node N0 is equal to VGH-VGL and the charge of the node N0 is not absorbed with the voltage boost circuit. Accordingly, power consumption of the output stage in the present embodiment can be reduced more than that of the circuit of the related art.

Moreover, the MOSFETs Q7, Q8 for potential setting are turned ON, by the gate control signal SWN3, in the timing t1 where the Q4 far from the output node N0 is turned OFF. Moreover, the MOSFETs Q5, Q6 for potential setting are turned OFF, by the gate control signal SWP3, in the timing t3 where the Q2 far from the output node N0 is turned ON. The Q3 in the nearer to the output node N0 is turned OFF in the timing t2 between t1 and t3, while the Q1 is turned On in the timing t2.

Accordingly, an output OUT of the buffer sequentially changes step by step from the power source voltage VGL to VL, VH, and to VGH as shown in FIG. 4C and thereby it can be prevented that a higher voltage is applied across the source and drain of the MOSFETs Q1 to Q4. When the input signal IN of the gate signal buffer 120 changes to the low level from the high level, operation is performed in the inverse sequence from that explained above (timing t4 to t6).

In addition, in the period T1 where the MOSFETs Q1, Q2 in the high level are turned OFF, the MOSFETs Q5, Q6 for potential setting are turned ON. Therefore, the potential VN1 at the node N1 is set to VH and the voltage of VH-VGL (=20V) smaller than VGH-VGL (=30V) is applied across the source and drain of the Q1, while the voltage of VGH-VH (=10V) is applied across the source and drain of the Q2.

Similarly, in the period T2 where the MOSFETs Q3, Q4 in the low level are turned OFF, the MOSFETs Q7, Q8 for potential setting area turned ON. Accordingly, the potential VN2 at the node N2 is set to VL and the voltage VGH-VL (=20V) smaller than VGH-VGL (=30V) is applied across the source and drain of the Q3, while the voltage VL-VGL (=10V) is applied across the source and drain of the Q4.

As explained above, only the maximum voltage of 20V is applied across the source and drain of the MOSFETs Q1 to Q4 of the output stage. On the contrary, a voltage of about 30V is applied across the source and drain of the output MOSFET in the buffer including the output stage formed of a couple of MOSFETs connected in series to which the present invention is not applied.

For this purpose, the MOSFETs Q1 to Q4 in the output stage of this embodiment may be constituted by the element having lower voltage resistance which is lower than that of the buffer element including the output stage of the existing type formed of a couple of MOSFETs connected in series to which the present embodiment is not applied. In more concrete, when the present embodiment is not applied, the MOSFET having higher voltage resistance of the structure shown in FIG. 5A must be used as the element of the output stage of the output buffer. However, when the present embodiment is applied, the MOSFET, for example, having comparatively lower voltage resistance in the structure shown in FIG. 5B may be used.

Figure 5A:
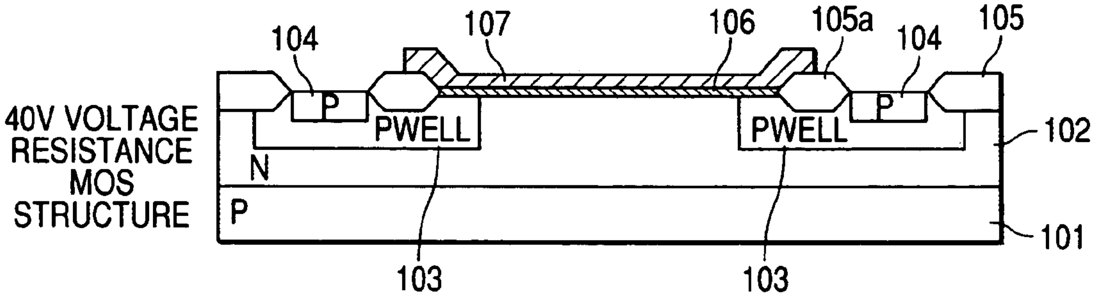
Figure 5B:
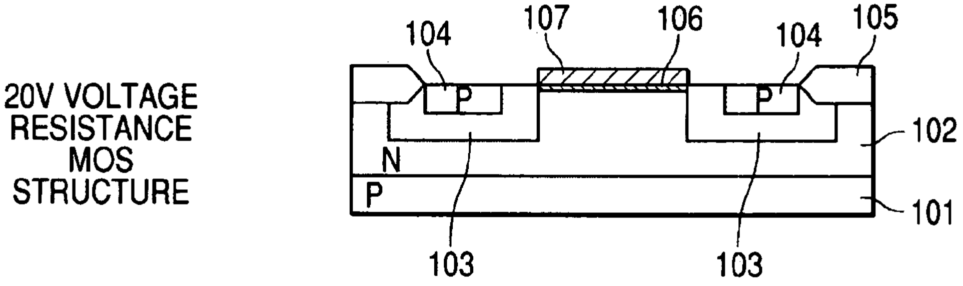

In FIG. 5A and FIG. 5B, the numeral 101 denotes a single crystal silicon substrate; 102, an N well region which becomes a channel region; 104, a diffusing region which becomes a source-drain region; 105, an insulating film for element isolation; 106, a gate insulating film; and 107, a polysilicon gate electrode. The element of FIG. 5A is designed to provide higher voltage resistance through longer distance between the gate electrode 107 and the area far from the end part, by forming the diffusing layer 104 which becomes the source-drain region on the well region 103 and then providing an insulating film 105*a* between the gate electrode 107 and the diffusing layer 104. As can be understood from comparison of FIG. 5A and FIG. 5B, the element of high voltage resistance of FIG. 5A occupies the area larger than that of the element of low voltage resistance of FIG. 5B. Therefore, the occupation area of the output buffer can be reduced through application of the present embodiment.

Moreover, although not apparent from the drawings, the element having higher voltage resistance of FIG. 5A is formed thicker in the gate insulating film 106 than the element having lower voltage resistance of FIG. 5B. Therefore, when the element having higher voltage resistance of FIG. 5A is used, a process to form a thick gate insulating film only for such purpose is required and thereby the manufacturing cost rises as much as such requirement. In addition, the insulating film 105*a* provided between the gate electrode 107 and diffusing layer 104 is usually often formed with the process different from that for the insulating film 105 for element separation. Accordingly, a process for forming the insulating film 105*a* is required in a case where the element of higher voltage resistance is used.

Particularly when the gate signal generating circuit 210 is provided in the side of liquid crystal panel like the embodiment of FIG. 1, only several signals (three signals in this embodiment) are supplied to the gate signal generating circuit 210 and a less number of buffers may be required for the driver IC 100. Accordingly, it is not recommended, from the viewpoint of manufacturing cost, to use the element having high resistance voltage of FIG. 5A as the element to form a less number of buffers and to increase the processes to form such element.

Moreover, even when the element having low voltage resistance of FIG. 5B is considered, this element has the voltage resistance which is higher than that of the element (not illustrated) forming an internal logic which operates in the power source voltage of 5V. The element of FIG. 5B is designed to provide a higher voltage resistance through longer distance between the gate electrode 107 and the end part by forming the diffusing layer 104 which becomes the source-drain region on the well region 103.

In order to attain higher voltage resistance, it is better that the gate insulating film 105 is formed thicker than that of the element constituting the internal logic. However, even in this case, since the source line drive circuit 110 is constituted to output the signal having the amplitude of about 20V in the driver IC of the embodiment of FIG. 1, the element to form the source line drive circuit 110 must be selected as the element having the voltage resistance which is higher than that of the element forming the internal logic. Accordingly, increase in the number of processes may be avoided by using the element which can be formed with the same process as the element forming the source line drive circuit 110 as the element to constitute the output buffer of FIG. 3.

Figure 6:
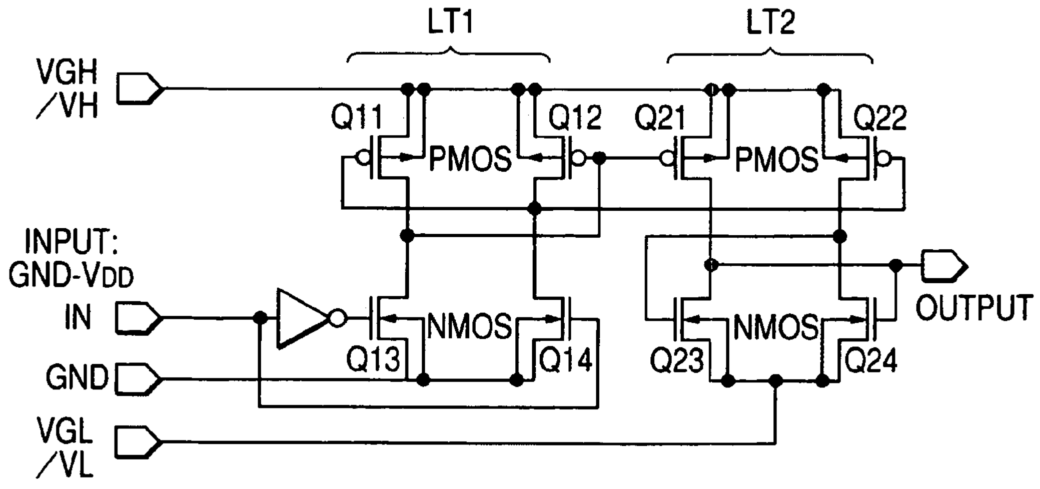
FIG. 6 is a circuit showing a concrete example of a level shift circuit in the gate signal buffer.

FIG. 6 shows a concrete circuit example of the level shift circuit used in an output control logic circuit 121 of the gate signal buffer 120. The level shift circuit of this embodiment is provided with a structure that a CMOS latch circuit LT2 formed of the MOSFETs Q21 to Q24 is connected in the next stage of a CMOS latch circuit LT1 in the preceding stage formed of the MOSFETs Q11 to Q14. Moreover, the level shift circuit selects desired two power source voltages from VGH, VH, VL, and VGL in accordance with the output signal among the gate control signals SWP1 to SWN3 of the MOSFETs Q1 to Q4 of the output stage.

Figure 7A:
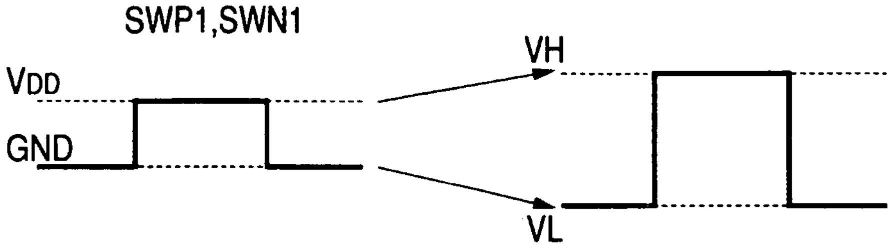
FIGS. 7A to 7C are explanatory diagrams showing potential changes of an input signal and an output signal of the level shift circuit used in the preferred embodiment.
Figure 7B:
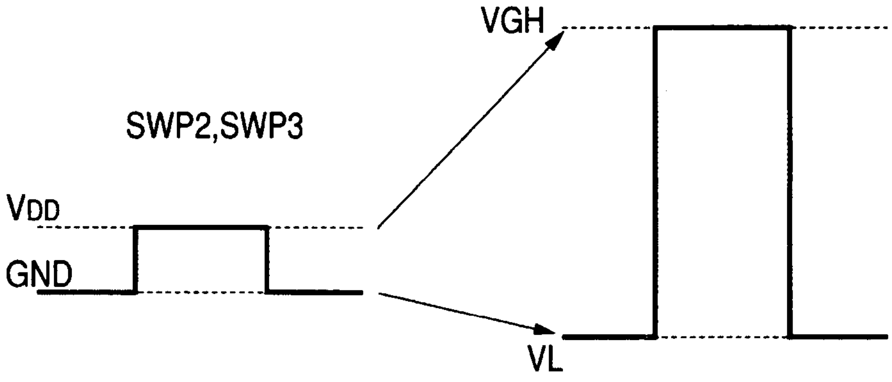
Figure 7C:
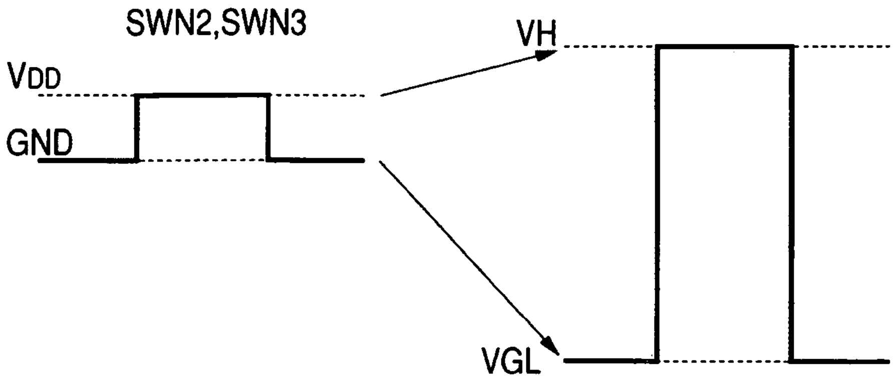

Thereby, as shown in FIGS. 7A to 7C, signals are converted into the gate control signals SWP1 to SWN3 of different potentials and amplitudes. In FIG. 7A to 7C, the left side waveform is the signal before conversion, while the right side waveform is the signal after conversion. In the case of gate control signals SWP1, SWN1, the signal VDD-GND is converted to the signal VH-VL as shown in FIG. 7A. Moreover, in the case of gate control signals SWP2, SWP3, the signal VDD-GND is converted to the signal VGH-VL as shown in FIG. 7B. In addition, in the case of gate control signals SWN2, SWN3, the signal VDD-GND is converted to the signal VH-VGL as shown in FIG. 7C.

The preferred embodiment of the present invention has been explained concretely, but the present invention is not restricted to the embodiment thereof and allows various changes and modifications within the scope not departing from the subject matter thereof. For example, in the embodiment, the transmission gate formed of the MOSFETs Q5, Q6, Q7, and Q8 is used as the potential setting means 122, and 123. However, the potential setting means 122, 123 may be constituted by the one MOSFETs, for example, Q5 and Q8.

Moreover, the diode which has been adequately set in the forward voltage in accordance with the power source voltages VGH-VH and VL-VGL may be used in place of the MOSFETs Q5, Q6, Q7, and Q8 as the switch elements. Here, when the diode which is smaller in the forward voltage than the power source voltages VGH-VH and VL-VGL is used in place of the MOSFET, it is also allowed to use a plurality of diodes connected in series.

In addition, the present invention can also be applied to a semiconductor integrated circuit including a tristate output buffer connected to an external bus. In this case, the output control logic circuit 121 of FIG. 3 is constituted by a logic circuit inputting the signal to be outputted and the control signal to designate the output state and a level shift circuit. When it is required to set the output to a high impedance, this purpose can be achieved by generating the signal for completely turning OFF the MOSFETs Q1 to Q4 in the output stage with the logic circuit and converting such signals into the gate control signals SWP1, SWP2, SWN1, SWN2 by the level shift circuit to control the Q1 to Q4.

Moreover, even in any case, the output VGH or VGL may be controlled to the high impedance state via the voltage VH or VL by adequately adjusting the timings of the signals SWP1, SWP2, SWN1, and SWN2. Moreover, it is also possible to protect the Q1 to Q4 from the voltage higher than the voltage resistance thereof by completely turning ON the switch elements Q5 to Q8 of the potential setting means 122 and 123 during the period where the Q1 to Q4 are completely turned OFF in the tristate output buffer explained above.

In above explanation, the present invention has been applied to the liquid crystal control driver IC for, driving the TFT liquid crystal panel as the application field of the invention. The present invention is not restricted only to such IC and can also be applied generally into the semiconductor integrated circuit including an output circuit and an output buffer which are provided with a plurality of transistors connected in series to output the signals of high potential differences.

What is claimed is:

1. A semiconductor integrated circuit comprising:

a first power source voltage terminal to which a first power source voltage is supplied;

a second power source voltage terminal to which a second power source voltage is supplied;

an output circuit including a plurality of transistors coupled in series between said first power source voltage terminal and said second power source voltage terminal; and potential setting means coupled to any connecting node among said plurality of transistors to set the potential of the connecting node to a potential between said first power source voltage and said second power source voltage when two transistors coupled to said connecting node are turned OFF, wherein each voltage resistance of a plurality of transistors is smaller than a potential difference between said first power source voltage and said second power source voltage.

2. The semiconductor integrated circuit according to claim 1, wherein a plurality of said transistors connected in series are comprised of a first transistor and a second transistor of a first conductivity type and a third transistor and a fourth transistor of a second conductivity type, wherein a first potential setting means is connected to a connecting node of said first transistor and said second transistor, and a second potential setting means is connected to a connecting node of said third transistor and said fourth transistor, and wherein a connecting node of said second transistor and said third transistor is connected to an output terminal.

3. The semiconductor integrated circuit according to claim 2, wherein a plurality of said transistors are insulated gate type field effect transistors, wherein said first potential setting means sets the connecting node of said first transistor and said second transistor and a base material of said second transistor to a first potential between said first power source voltage and said second power source voltage, and wherein said second potential setting means sets the connecting node of said third transistor and said fourth transistor and a base material of said third transistor to a second potential between said first power source voltage and said second power source voltage.

4. The semiconductor integrated circuit according to claim 1, wherein a plurality of said transistors are respectively controlled by a signal converted with a level converting circuit for converting an input signal of a first amplitude to a signal of a second amplitude larger than said first amplitude.

5. The semiconductor integrated circuit according to claim 1, wherein said potential setting means is a switch circuit connecting in series a first conductivity type transistor and a second conductivity type transistor.

6. A liquid crystal display driving semiconductor integrated circuit comprising:

a first power source voltage terminal to which a first power source voltage is supplied;

a second power source voltage terminal to which a second power source voltage is supplied;

an output circuit for outputting a signal supplied to a scanning line driving circuit of a liquid crystal panel on which said scanning line driving circuit for generating the drive signal applied to the scanning lines of said liquid crystal panel is mounted, wherein said output circuit is provided with an output circuit including a plurality of transistors connected in series between said first power source voltage terminal and said second power source voltage terminal; and potential setting means coupled to any of connecting nodes of a plurality of said transistors to set potential of the connecting node to a potential between said first power source voltage and said second power source voltage when two transistors connected to said connecting node are turned OFF, wherein a plurality of said transistors are smaller in each voltage resistance than a potential difference between said first power source voltage and said second power source voltage.

7. The liquid crystal display driving semiconductor integrated circuit according to claim 6, wherein a plurality of said transistors connected in series are comprised of a first transistor and a second transistor of a first conductivity type and a third transistor and a fourth transistor of a second conductivity type, wherein a first potential setting means is connected to a connecting node of said first transistor and said second transistor, and a second potential setting means is connected to a connecting node of said third transistor and said fourth transistor, and wherein a connecting node of said second transistor and said third transistor is connected to an output terminal.

8. The liquid crystal display driving semiconductor integrated circuit according to claim 7, wherein a plurality of said transistors are insulated gate type field effect transistors, wherein said first potential setting means sets the connecting node of said first transistor and said second transistor and a base material of said second transistor to a first potential between said first power source voltage and said second power source voltage, and wherein said second potential setting means sets the connecting node of said third transistor and said fourth transistor and a base material of said third transistor to a second potential between said first power source voltage and said second power source voltage.

9. The semiconductor integrated circuit according to claim 6, wherein a plurality of said transistors are respectively controlled by a signal converted with a level converting circuit for converting an input signal of a first amplitude to a signal of a second amplitude larger than said first amplitude.

10. The liquid crystal display driving semiconductor integrated circuit according to claim 6, wherein said potential setting means is a switch circuit connecting in series a first conductivity type transistor and a second conductivity type transistor.

* * * * *